United States Patent
Yoshizawa

(10) Patent No.: US 6,698,243 B1
(45) Date of Patent: Mar. 2, 2004

(54) METHOD AND APPARATUS FOR MANUFACTURING BENT GLASS SHEET

(75) Inventor: Hideo Yoshizawa, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 09/857,080

(22) PCT Filed: Dec. 1, 1999

(86) PCT No.: PCT/JP99/06743

§ 371 (c)(1),
(2), (4) Date: May 31, 2001

(87) PCT Pub. No.: WO00/32527

PCT Pub. Date: Jun. 8, 2000

(30) Foreign Application Priority Data

Dec. 3, 1998 (JP) .............................. 10-344051

(51) Int. Cl.⁷ .............................. C03B 23/033
(52) U.S. Cl. .............................. 65/104; 65/106; 65/118; 65/256; 65/268; 65/287; 65/289; 425/335; 425/373
(58) Field of Search .............................. 65/102, 104, 106, 65/118, 185, 186, 256, 257, 268, 286, 287, 289, 290, 291; 425/335, 373

(56) References Cited

U.S. PATENT DOCUMENTS

| | | |
|---|---|---|
| 3,545,951 A | 12/1970 | Nedelec |
| 3,832,153 A | 8/1974 | Bezombes |
| 4,069,617 A | 1/1978 | Koike |
| 4,123,246 A | 10/1978 | Johnson |
| 4,139,359 A | 2/1979 | Johnson et al. |
| 4,292,065 A | 9/1981 | Nedelec et al. |
| 4,318,728 A | 3/1982 | Claassen |
| 4,540,426 A | 9/1985 | Bocelli et al. |
| 4,615,931 A | 10/1986 | Matsuyoshi et al. |

(List continued on next page.)

FOREIGN PATENT DOCUMENTS

| | | |
|---|---|---|
| DE | 37 12 162 | 1/1988 |
| DE | 39 08 644 C1 | 3/1989 |
| DE | 39 28 968 C1 | 12/1989 |
| DE | 41 04 086 C1 | 2/1991 |
| EP | 0 133 144 B1 | 2/1985 |
| EP | 0 346 197 | 12/1989 |
| EP | 0 477 913 A2 | 4/1992 |
| FR | 2137143 | 5/1971 |
| GB | 1103192 | 3/1965 |
| GB | 1112781 | 5/1965 |
| JP | 44-14832 | 7/1969 |
| JP | 49-10331 B | 5/1974 |
| JP | 51-141123 | 12/1976 |
| JP | 54-85217 A | 7/1979 |
| JP | 55-75930 A | 6/1980 |
| JP | 55-42231 B | 10/1980 |
| JP | 64-48315 U | 9/1987 |
| JP | 2-221133 | 9/1990 |
| JP | 3-50132 A | 3/1991 |
| JP | 3-174334 A | 7/1991 |
| JP | 5-9037 A | 1/1993 |
| JP | 6-40732 A | 2/1994 |
| JP | 7-237928 A | 9/1995 |
| JP | 10-203840 A | 8/1998 |
| JP | 11-500796 A | 1/1999 |
| JP | 11-147728 A | 6/1999 |
| WO | WO 99/24373 | 5/1999 |

*Primary Examiner*—Sean Vincent
(74) *Attorney, Agent, or Firm*—Merchant & Gould P.C.

(57) ABSTRACT

A heated glass sheet is bent by pressing together with at least one belt made of a heat-resistant material against a bending member. The glass sheet is bent as the glass sheet is conveyed with the belt along the bending member, and the bending member is curved at least in a direction that is vertical to a conveying direction of the glass sheet. According to this invention, the bent glass sheets having surfaces on which defects such as mark of rollers are reduced can be produced efficiently.

12 Claims, 15 Drawing Sheets

U.S. PATENT DOCUMENTS

| | | |
|---|---|---|
| 4,666,496 A | 5/1987 | Fecik et al. |
| 4,820,327 A | 4/1989 | Letemps et al. |
| 4,863,419 A | 9/1989 | Sansone |
| 4,899,872 A | 2/1990 | Hokao |
| 4,904,294 A | 2/1990 | Schultz et al. |
| 4,957,528 A | 9/1990 | Letemps et al. |
| 4,969,966 A | 11/1990 | Norman |
| 4,983,205 A | 1/1991 | Kuster |
| 5,022,907 A | 6/1991 | Vanaschen et al. |
| 5,069,705 A | 12/1991 | Letemps et al. |
| 5,264,058 A | 11/1993 | Hoagland et al. |
| 5,286,542 A | 2/1994 | Susi et al. |
| 5,443,669 A | 8/1995 | Tünker |
| 5,946,860 A | 9/1999 | Weber et al. |
| 6,279,347 B1 | 8/2001 | Yoshizawa |

A—A (a)

B—B (b)

C—C (c)

METHOD AND APPARATUS FOR MANUFACTURING BENT GLASS SHEET

FIELD OF THE INVENTION

The present invention relates to a method and an apparatus for manufacturing curved glass sheets. More precisely, the present invention relates to an efficient method and an apparatus for manufacturing curved glass sheets that are useful for example as window glass for buildings or vehicles.

BACKGROUND OF THE INVENTION

Curved glass sheets are widely used for vehicles and buildings, and especially in the field of window glass for automobiles, there is a great demand for curved glass sheets due to design and aerodynamic considerations. Glass sheets that are mass-produced mainly using the float method primarily are formed into flat shapes. These flat glass sheets are formed into curved glass sheets in a secondary bending process, for which a number of industrial methods are known. Moreover, if the glass sheet is heated for the bending step, it is often quenched afterwards to temper it.

Methods for bending the glass that are widely employed include forming the heated glass sheet by sandwiching it with a pair of press molds. One type of these methods that is widely employed includes horizontal conveyance of the heated glass sheet to the press position with rollers for example, in order to avoid press marks from tongs on the surface of the glass sheet. As a means for horizontally conveying the glass sheet, rollers are common, but belts are also used.

For example, Publication of Unexamined Japanese Patent Application No. Hei 3-50132 (JP-A-3-50132) discloses a method wherein a glass sheet is carried out of a furnace, conveyed by a belt to a pressing position, and press-formed together with the belt. This method takes advantage of the belt's flexibility to reduce the glass sheet's temperature decrease between heating and quenching. That is, the glass sheet is bent while it contacts the belt, and it is also quenched in this situation. Furthermore, Publication of Unexamined Japanese Patent Application No. Hei 6-40732 (JP-A-6-40732) proposes methods for bending and tempering glass sheets that are improvements of this method.

However, regardless of the means for conveying the glass sheet, the glass sheet has to be temporarily stopped in the press mold during the forming step in these methods for bending glass sheets by press forming.

With regard to the manufacturing efficiency of continuous production of curved glass sheets, methods have been proposed wherein the glass sheet is bent without stopping it on the manufacturing line. In some of these methods, the glass sheet is heated and softened inside a furnace while conveying it horizontally, and using the glass sheet's own weight, the glass sheet is gradually adapted to the surface form of for example an airbed for conveying the glass sheet. These methods (sag bending) are very efficient for continuous production of glass sheets having the same curved shape, and have been employed with various improvements (see for example Publication of Unexamined Japanese Patent Application No. Hei 7-237928; JP-A-7-237928).

Moreover, Publication of Unexamined Japanese Patent Application No. Sho 55-75930; JP-A-55-75930) discloses a method wherein a glass conveying passage having a curvature is set up as a continuation to the carry-out opening of the furnace, and the glass sheet is bent while being conveyed by rollers on this conveying passage. Compared to a sag bending method, this method has a better heating efficiency and the shape of the curved glass can be changed easier.

Other methods have been proposed, wherein, while conveying the glass sheet with rollers, the glass sheet is bent not only in the direction in which it is conveyed, but also in the direction that is perpendicular to the conveying direction (referred to as "cross direction" in the following).

For example, Publication of Unexamined Japanese Patent Application No. Hei 3-174334 (JP-A-3-174334) proposes a method, wherein rollers made of an elastic body are arranged above and below the glass sheet, and by applying a stress onto these roller pairs from the outside so as to bend them into a certain shape, the glass sheet also is bent in the cross direction Roller pairs for bending a glass sheet in a cross direction or for conveying a glass sheet that has been bent in the cross direction are disclosed for example in Publication of Unexamined Japanese Patent Application No. Sho 54-85217 (JP-A-54-85217) and No. Sho 55-75930 (JP-A-55-75930).

However, when bending the glass sheet with rollers that are arranged on both sides of the conveying passage, pressure is exerted locally on the surface of the glass. Consequently, there is the problem that roller marks often appear on the surface of the glass sheet. Scratches and bumps on the surface of the glass sheet caused by the rollers often lead to optical defects, especially in the field of vehicle window glass.

Furthermore, in continuous bending with rollers, there is the problem that the degree of freedom for forming the glass sheet and the precision are insufficient. When bending with rollers, the glass sheet is bent while it spans the rollers. Consequently, it is difficult to attain the desired bent shape at the front edge and the rear edge of the glass sheet with respect to the conveying direction. And if bending is performed with elastic deformation of the rollers, it is difficult to attain the desired bending shape precisely.

SUMMARY OF THE INVENTION

The present invention has been conceived upon consideration of these circumstances. It is an object of this invention to provide a method for bending a glass sheet while it is being conveyed, which has better manufacturing efficiency, where defects on the surface of the glass sheet do not occur easily, and where the degree of freedom and the precision for forming are improved. It is also an object of this invention to provide a manufacturing apparatus that is suitable for this manufacturing method.

In order to achieve these objects, a method for manufacturing a bent glass sheet in accordance with the present invention comprises heating a glass sheet in a heating furnace to a temperature where the glass sheet is changeable in shape, conveying the glass sheet out from the heating furnace, and bending the glass sheet by pressing the glass sheet against a bending member. The glass sheet is pressed together with at least one belt made of a heat-resistant material. The glass sheet is bent as the glass sheet is conveyed with the belt along the bending member. The bending member is curved at least in a direction that is perpendicular to a conveying direction of the glass sheet (i.e. the cross direction).

With this manufacturing method, the glass sheet can be continuously bent together with the belt. Therefore, the glass sheet can be manufactured with better efficiency, while defects on the surface of the glass sheet are suppressed.

Moreover, the degree of freedom and the precision for forming are improved.

In order to achieve these objects, an apparatus for manufacturing a curved glass sheet in accordance with the present invention comprises a heating furnace for heating a glass sheet to a temperature where the glass sheet is changeable in shape, and a bending apparatus adjacent to the heating furnace so as to accept the glass sheet from the heating furnace and bend the glass sheet as conveying the glass sheet. The bending apparatus includes a conveying passage for the glass sheet, a bending member and at least one belt made of a heat-resistant material for conveying the glass sheet. The bending member is curved at least in a direction that is perpendicular to a conveying direction of the glass sheet (i.e. the cross direction). At least a portion of the belt is arranged along the bending member.

With this manufacturing apparatus, a curved glass sheet where defects on the surface of the glass sheet do not occur easily can be manufactured with better manufacturing efficiency, and with an improved degree of forming freedom and forming precision.

DETAILED DESCRIPTION OF THE INVENTION

Figure 1:
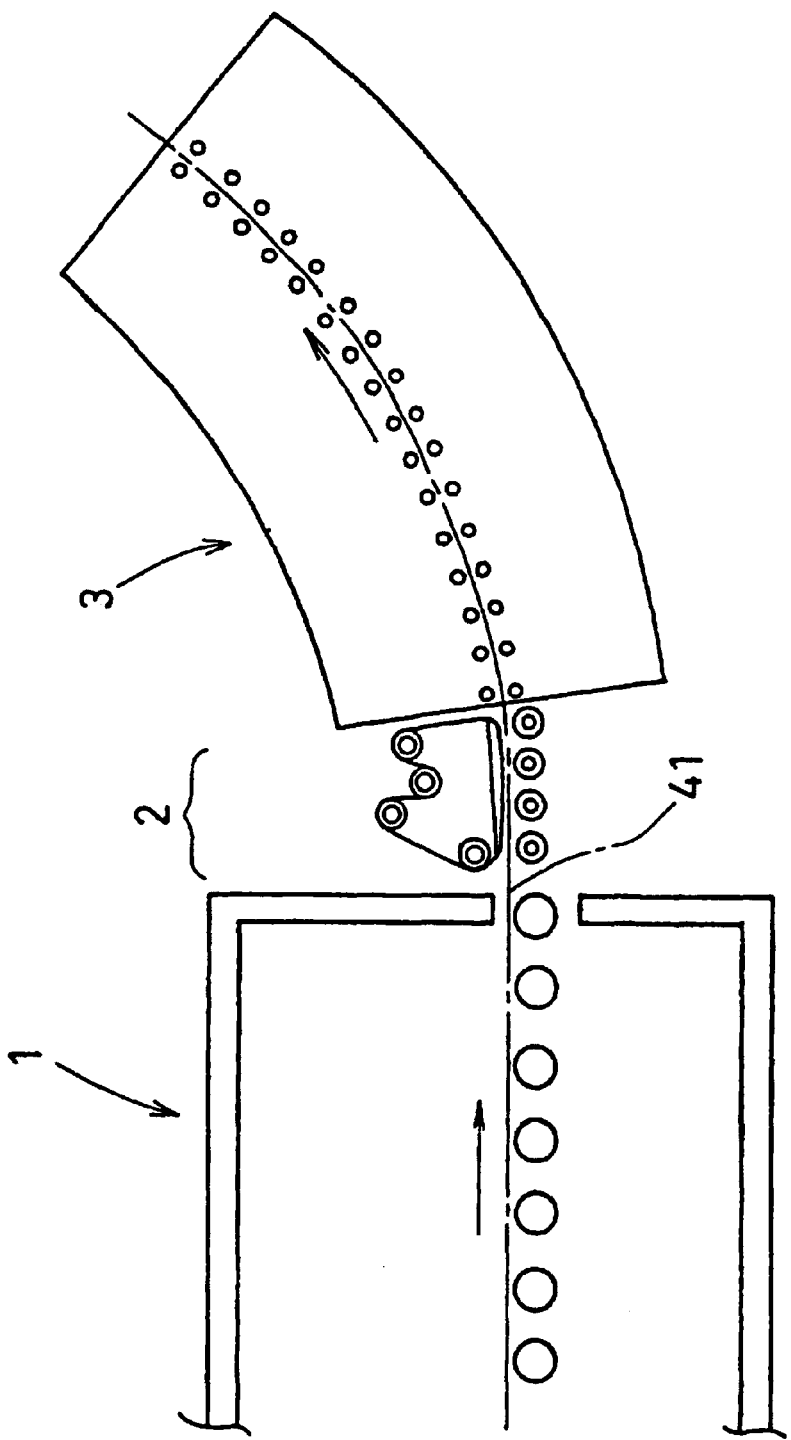
FIG. 1 is a cross-sectional view of an embodiment of a manufacturing apparatus according to the present invention.

The following is a more detailed explanation of a preferred method and apparatus for manufacturing a curved glass sheet in accordance with the present invention.

In the method and the apparatus of the present invention, it is preferable that a degree of curvature of the bending member gradually increases toward a downstream conveying side of the glass sheet.

It is preferable that the bending member is also curved in the conveying direction of the glass sheet. It is also preferable that the conveying passage gradually deviates from a direction in which the glass sheet is conveyed from the heating furnace. The glass sheet is preferably conveyed with, the belt along the conveying passage. According to these preferable configurations, a glass sheet with complex curvature that is bent in two directions can be manufactured with high efficiency. It is preferable that the glass sheet is bent so as to have a predetermined curvature with respect to the conveying direction.

With regard to the cross direction of the glass sheet, the glass sheet can be bent into any desired shape, but it is also possible that the glass sheet has a certain curvature in its cross direction as well as in the conveying direction. In such a curved glass sheet, there are no partial changes of the form, and optical distortions (reflective distortions) hardly occur.

The curved glass sheet produced by the present invention may be cylindrical. However, the curved glass preferably has a first curvature radius of 5000 mm to 50000 mm along a first direction and a second curvature radius in the range no less than 500 mm but less than 5000 mm along a second direction that is perpendicular to the first direction.

If the glass sheet is bent so as to have a certain curvature in two directions, and if the curvature radius in the conveying direction of the glass sheet is large (slight bending) and the curvature radius in the cross direction of the glass sheet is small (pronounced bending), then the conveyance of the glass sheet becomes easy. On the other hand, if the curvature radius in the conveying direction of the glass sheet is small (pronounced bending) and the curvature radius in the cross direction of the glass sheet is large (slight bending), then the bending of the glass sheet becomes easy.

In the method of the present invention, it is preferable that the glass is cooled for quenching or annealing after separating from the belt. When the glass sheet is quenched, a tempered curved glass sheet can be obtained. Moreover, by adjusting the quenching degree, it is also possible to obtain semi-tempered curved glass sheets. The apparatus of the present invention preferably further includes a cooling apparatus for quenching or annealing the glass sheet adjacent to the bending apparatus. The cooling apparatus preferably includes a curved conveying passage for the glass sheet that has a predetermined curvature with respect to the conveying direction of the glass sheet.

The glass sheet is preferably bent while it is sandwiched between a pair of belts, because this improves the surface conditions and precision of the glass sheet even further. The belts are preferably arranged above and below the glass sheet conveying passage in the bending apparatus.

It is also preferable that the belts are suspended so that they describe an endless track, a part of which comprises the conveying passage of the glass sheet. Furthermore, it is preferable that rollers and belt temperature adjusting devices are arranged along the track described by the belt for controlling the belt tension. It is also preferable that the endless track of the belt is set within the bending apparatus and is separated from the glass sheet cooling apparatus.

In the apparatus of the present invention, it is preferable that the bending apparatus further comprises a belt-driving device for driving a belt together with the glass sheet. The belt-driving device conveys the glass sheet, which is pressed with the belt against the bending member, with an appropriate speed in the downstream direction.

In the apparatus of the present invention, it is preferable that the bending apparatus is provided with pressing members for pressing the glass sheet to the forming surface together with the belt. For the pressing member, a mold member provided with a surface having the inverse shape of the forming face of the forming block or free rollers can be used for example. As free rollers, integrated rollers having rotatable flexible sleeves attached to rods that are curved into a certain shape, or a plurality of free rollers that are arranged in the cross direction of the glass sheet can be used for example.

The following is a description of the preferred embodiments of the present invention with reference to the accompanying drawings.

First Embodiment

FIG. 1 is a cross-sectional view showing an embodiment of a manufacturing apparatus of the present invention. As is shown in FIG. 1, this manufacturing apparatus comprises a furnace 1, a bending apparatus 2, and a quenching apparatus 3, which use a continuous common glass conveying passage 41. Inside the furnace 1, the glass conveying passage 41 is substantially horizontal, inside the bending apparatus 2, it gradually slopes upwards and away from the horizontal direction, and inside the quenching apparatus 3, it describes a curve with a certain curvature radius $R_1$.

Figure 2:
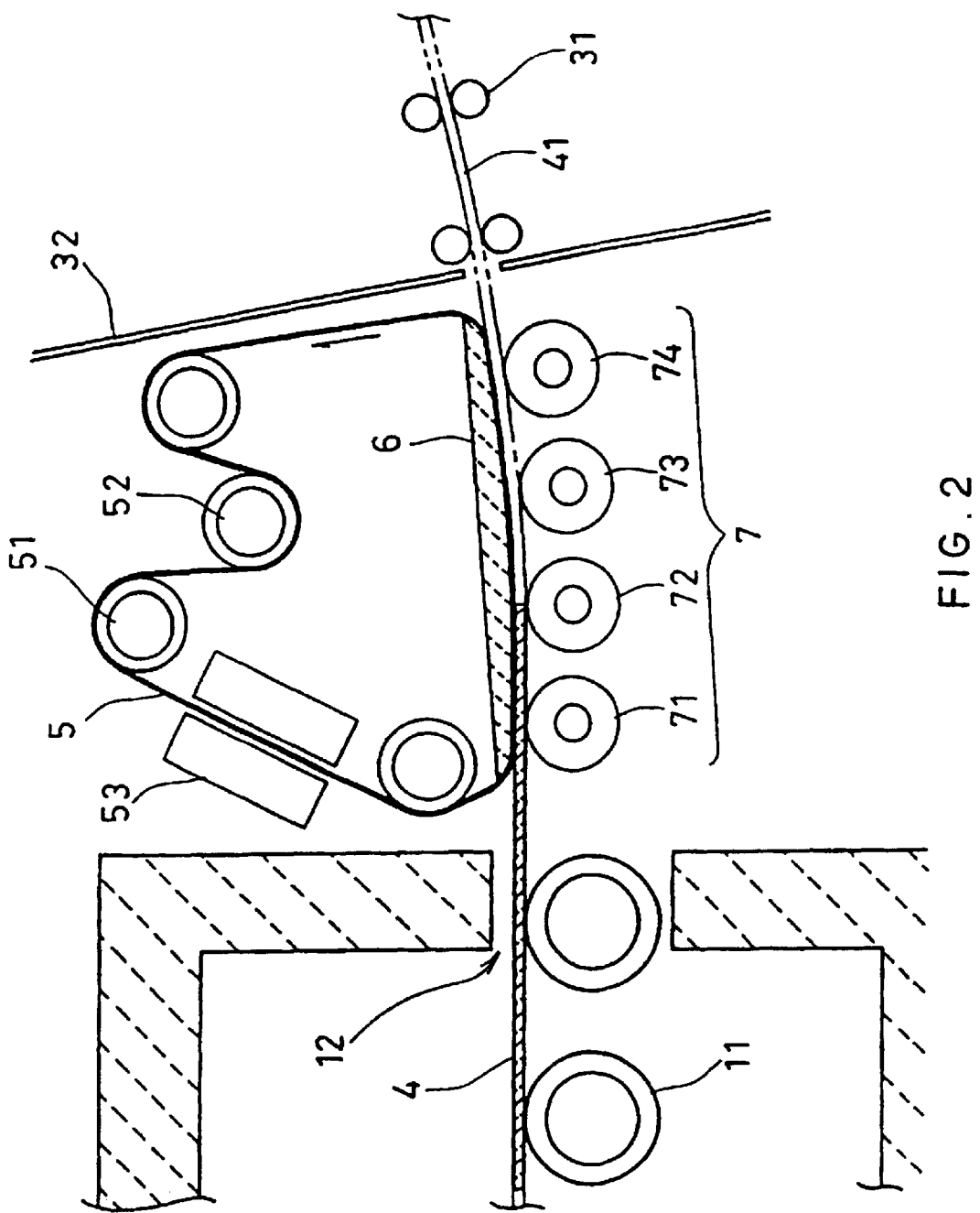
FIG. 2 is a magnified cross-sectional view showing a bending apparatus of the manufacturing apparatus in FIG. 1.

FIG. 2 is an enlarged cross-sectional view showing the bending apparatus 2 of the apparatus shown in FIG. 1. As is shown in FIG. 2, in the bending apparatus, press rollers 7 are arranged below the glass conveying passage 41, and a bending member (forming block) 6 is arranged above the glass conveying passage 41. Furthermore, the bending apparatus 2 is provided with a heat-resistant belt 5. A portion of the heat-resistant belt 5 is positioned along the glass conveying passage 41, between the glass conveying passage 41 and the forming block 6.

The heat-resistant belt 5 is suspended in a loop-shape by rollers and by the forming block, and forms an endless track. The rollers include a driving roller 51 and a tension roller 52. A driving device (not shown in the drawings) is connected to the driving roller 51. Moreover, by adjusting the position of the tension roller 52, the tension of the heat-resistant belt 5 can be adjusted to suitable conditions. Moreover, a belt temperature adjusting device 53 is arranged on both sides of the endless track of the heat-resistant belt 5. By heating or cooling with the belt temperature adjusting device 53, the temperature of the heat-resistant belt 5 can be kept within a range that is suitable for forming.

The heat-resistant belt 5 is made of a heat-resistant fiber, such as for example metal fiber, inorganic fiber, carbon fiber, or aramid fiber. The heat-resistant material for the heat-resistant belt 5 can be obtained by weaving, twilling, or knitting for example. It is also possible to form heat-resistant material into a felt or a web so as to obtain the heat-resistant belt 5. It is preferable that the heat-resistant belt 5 is sufficiently wide to cover the glass sheet conveyed along it.

As is shown in FIG. 2, a part of the surface of the forming block 6 is in contact with the endless track described by the heat-resistant belt 5, and a part thereof faces the glass conveying passage 41. The surface of the forming block 6 that faces the glass conveying passage 41 functions as a forming surface for bending the glass sheet with pressure. As a material for the forming block 6, various metals and ceramics can be used. The forming block 6 can be formed in one piece as shown in FIG. 2, but it is also possible to form it by combination of a plurality of separate members.

Figure 3:
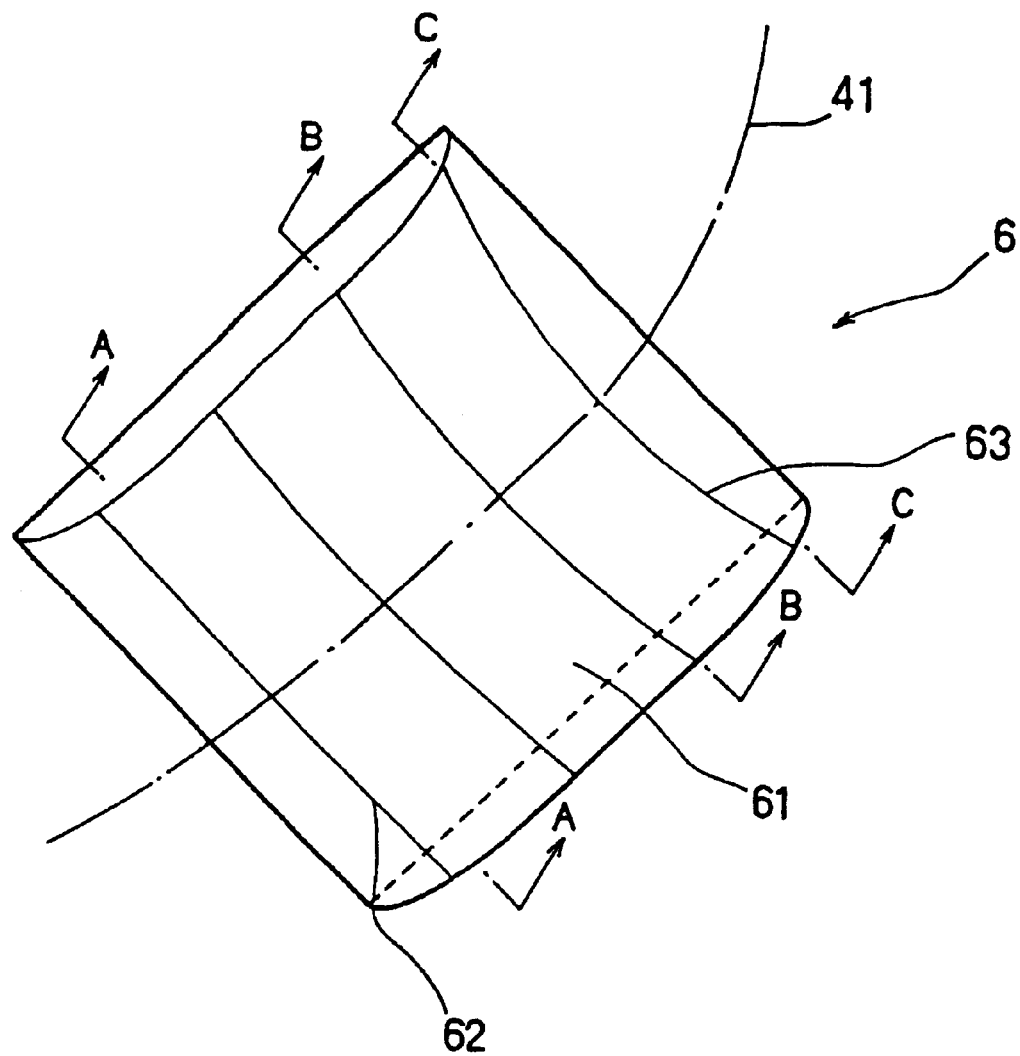
FIG. 3 is a perspective view of an embodiment of a bending member.
Figure 4:
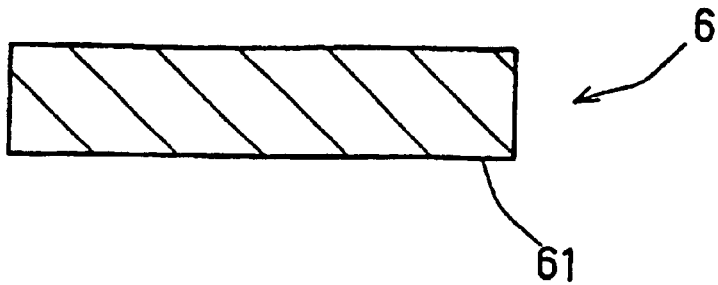
FIG. 4 shows cross-sectional views of the bending member of FIG. 3.
Figure 4:
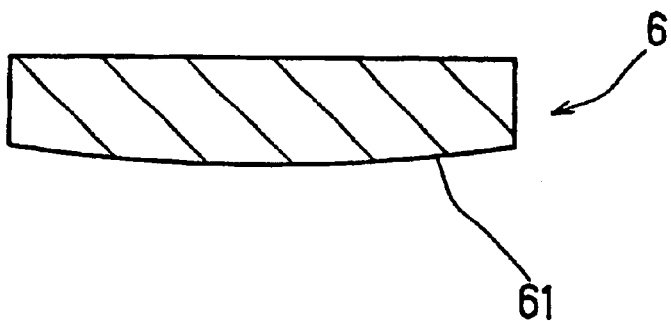
Figure 4:
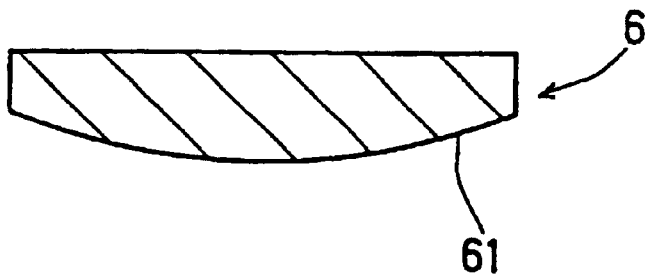
Figure 5:
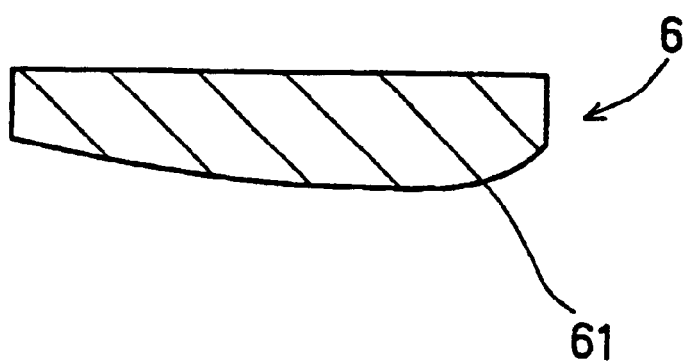
FIG. 5 is a cross-sectional view of an embodiment of another bending member.

FIG. 3 is a perspective view showing the forming face 61 of the forming block 6 from below the conveying passage. FIGS. 4(a)–(c) are cross-sectional views of the forming block 6 in FIG. 3, taken along the lines A—A, B—B, and C—C, respectively. Near the line of first contact 62, where the glass sheet contacts the forming block 6 first, the forming face 61 is flat (FIG. 4(a)). Proceeding in the conveying direction of the glass conveying passage 41, the forming face 61 bends gradually (FIG. 4(b)). Near the line of last contact 63, where the glass sheet separates from the forming block 6, the forming face 61 applies to the glass sheet a predetermined curved shape in the cross direction of the glass sheet (FIG. 4(c)). The curved shape of the forming face 61 shown in FIG. 6 will be the shape that is applied to the glass sheet in the cross direction. This curved shape can have for example a predetermined curvature radius $R_2$, or it can be for example an arch with an eccentric vertex, as shown in FIG. 5.

As is shown in FIGS. 2 and 3, near the line of first contact, the forming face 61 is parallel to the direction in which the glass sheet is conveyed from the furnace (horizontal direction). However, proceeding in the conveying direction, the forming face gradually tilts upwards from the horizontal direction. Near the line of last contact, the forming face 61 has substantially the same curvature radius $R_1$ as the glass conveying passage inside the quenching apparatus.

It is preferable that a heater is attached to the forming block 6. Thus, the forming block can be kept, like the belt, at a temperature that is appropriate for bending glass, and the glass sheet can be accurately formed from the initial stage in a continuous production.

As is shown in FIG. 2, the press rollers 7 are arranged along the lower side of the conveying passage 41. The purpose of these press rollers 47 is to press the glass sheet against the forming block 6, while it is travelling along the conveying passage 41. Like the belt, the surface of the press rollers 47 is made of a heat-resistant material. It is preferable that a material such as felt is used that cushions the glass sheet. Furthermore, the press rollers 71, 72 etc. are non-driven rollers (free rollers) that rotate with little external force. It is of course also possible to connect the press rollers 7 to a driving mechanism to rotate them with the rotational velocity that is necessary to convey the glass sheet.

The number of press rollers 7 can be determined in accordance with the desired curved shape for the glass sheet, but in general, at least two rollers are necessary. It is preferable to provide at least five rollers.

For the rollers 71, 72 etc., a rod can be used that is made, for example, of an elastic body to which a supporting member for supporting the glass sheet has been attached. For this supporting member, a plurality of disk-shaped or cylindrical flexible sleeves can be used, for example. Furthermore, the rollers do not have to be formed of one body, and it is also possible to use a plurality of rollers across the cross direction of the glass sheet.

Figure 6:
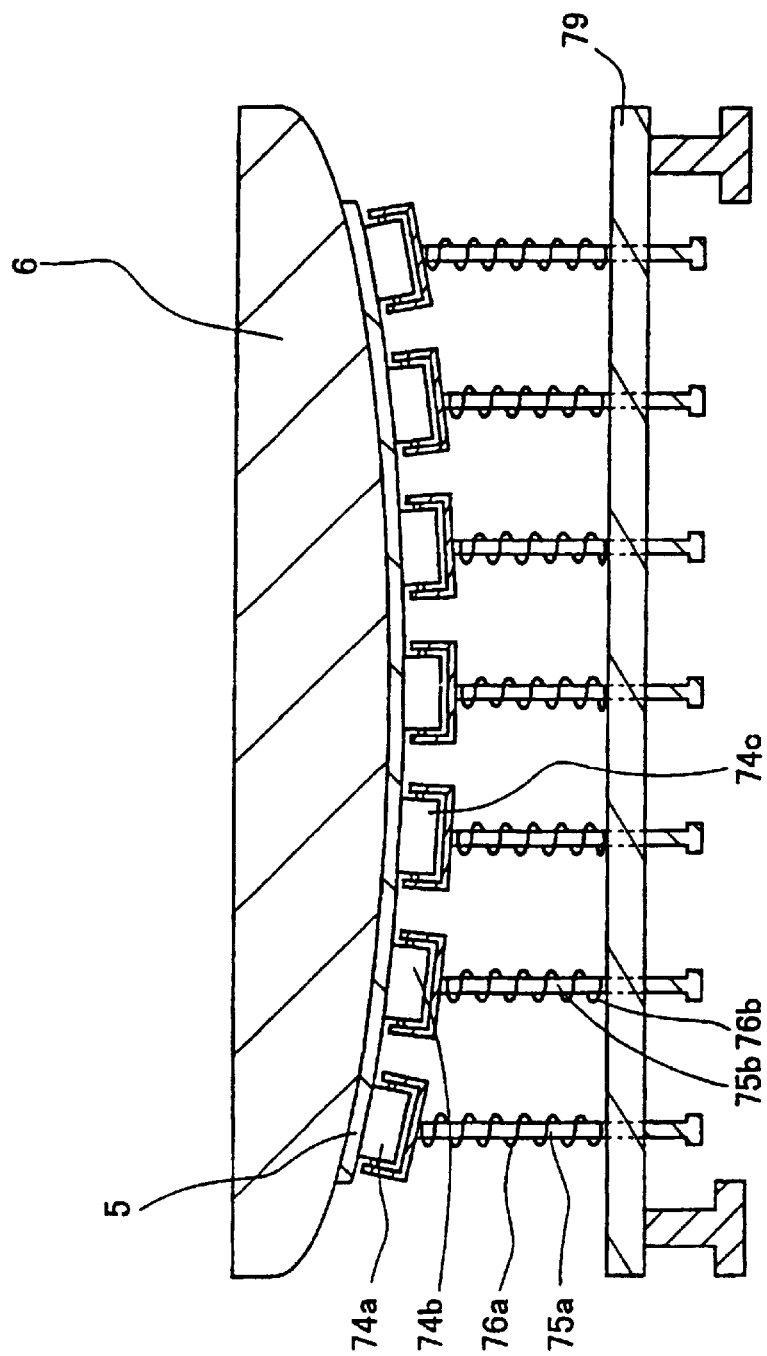
FIG. 6 is a cross-sectional view of an embodiment of a bending apparatus seen from the glass conveying direction.

FIG. 6 is a cross-sectional view of a bending apparatus using a plurality of rollers as press rollers 74 (see FIG. 2), taken from the furnace side. The press rollers 74a, 74b, 74c, etc. in FIG. 6 are attached to the ends of rods 75a, 75b, etc. Moreover, the rods 75a, 75b, etc. are inserted into a base member 79 from which they can freely ascend and descend. The rods 75a, 75b, etc. are pushed upwards by springs 76a, 76b, etc., whose lower end is defined by the base member 79. As a result, the rollers 74a, 74b, 74c, etc. push the heat-resistant belt 5 (and when a glass sheet is passed along, the glass sheet and the heat-resistant belt) against the forming block 6.

Figure 7:
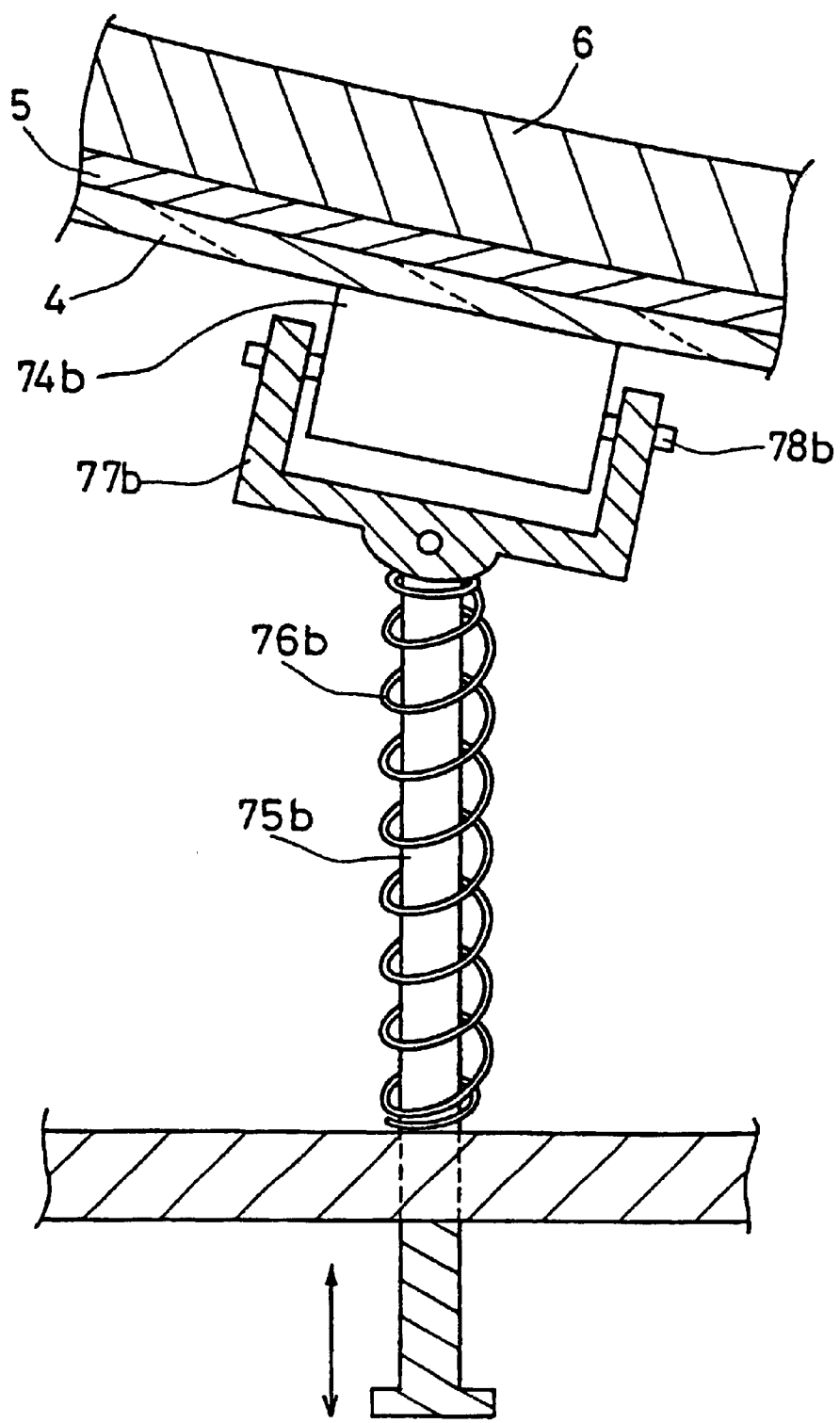
FIG. 7 is a magnified cross-sectional view showing a press roller shown in FIG. 6.

FIG. 7 shows a magnification of the press roller 74b. The press roller 74b is attached to an axis 78b that is supported rotatably by a supporting member 77b. The supporting member 77b is attached to the end of the rod 75b and is freely tiltable in cross direction of the glass sheet. Thus, a plurality of free rollers 74a, 74b, 74c, etc. that are arranged in cross direction of the glass sheet 4 are used as members for pressing the glass sheet 4 together with the belt 5 against the forming block 6. If these rollers are tiltable in the cross direction of the glass sheet, and each roller is pressed into the direction of the forming block, then each portion of the surface of the glass sheet can be pressed precisely against the forming block.

Figure 8:
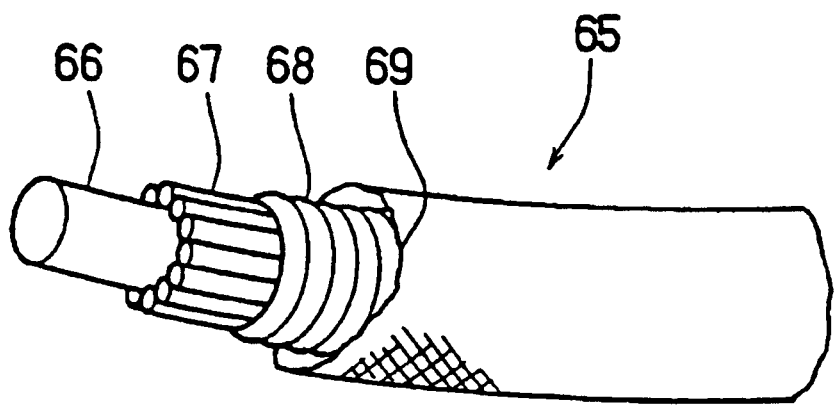
FIG. 8 is a perspective view showing the internal structure of a press roller according to another embodiment.
Figure 9:
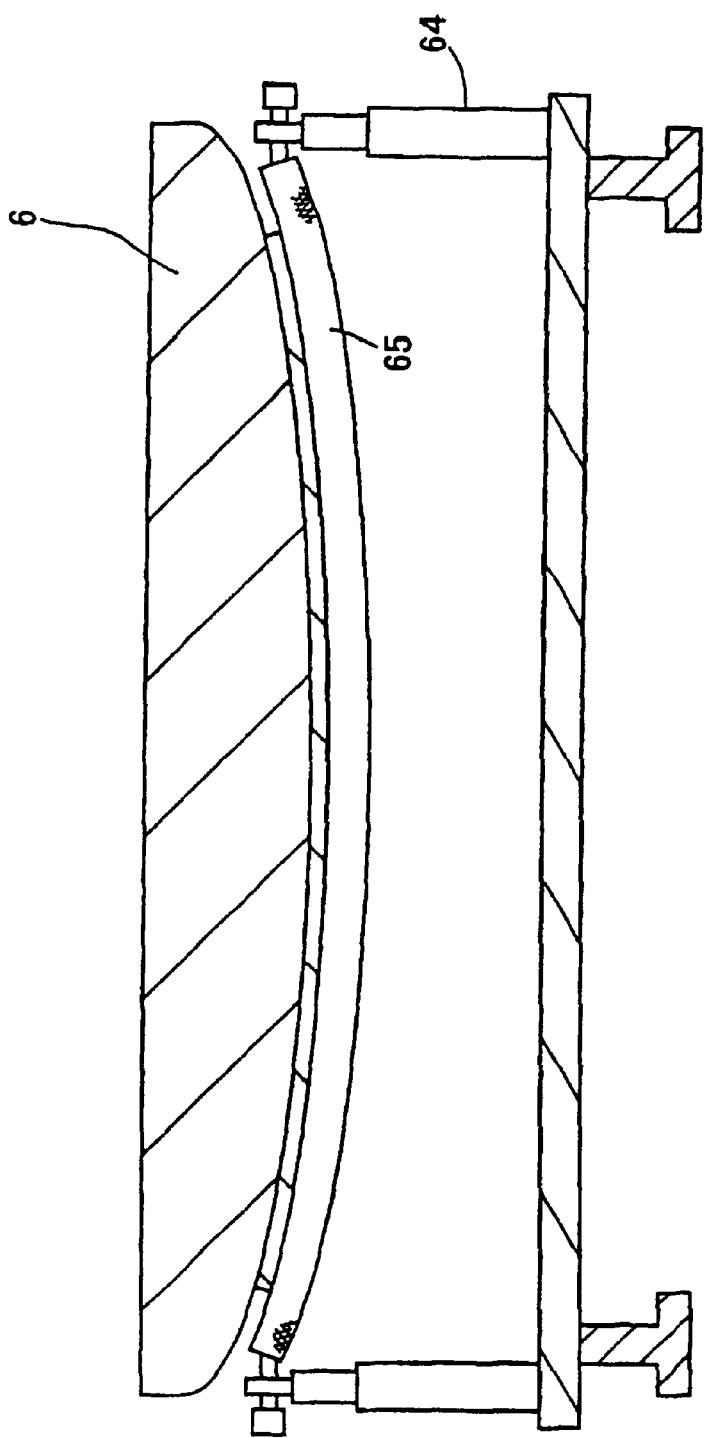
FIG. 9 is a cross-sectional view of an embodiment of a bending apparatus using the press roller shown in FIG. 8.

FIGS. 8 and 9 show an example of an integrated press roller. As is shown in FIG. 8, this roller 65 comprises a bendable core 66 made of an elastic material, rods 67 made of elastic material that are arranged around and along the core 66, a coil spring 68 wrapped around the core 66 and the rods 67, and a sleeve 69 made of a heat-resistant material that covers the coil spring 68. As is shown in FIG. 9, the surface of the glass sheet is precisely pressed against the forming block by supporting both ends of the roller 65 rotatably with a supporting member 64 provided with a mechanism to adjust the height.

For the furnace 1, in general a conventionally used apparatus can be used. There is no particular limitation concerning the glass conveying means in the furnace 1, but rollers 11 are preferable, considering heating efficiency.

In the quenching apparatus 3, the glass conveying passage is provided with a curvature radius $R_1$ in conveying direction corresponding to the curvature radius that has been imparted on the glass sheet. Conveyor rollers 31 are arranged on both sides of the glass conveying passage (see FIG. 2). For the conveyor rollers 31, rollers are used that are provided with a curved shape that has been applied to the glass in the cross direction. Nozzles (not shown in the drawing) for blowing cool air are arranged along the glass conveying passage 41. However, the curved glass also can be gradually cooled (annealed) without blowing cool air against it, while being conveyed along the conveying passage. Moreover, a converter for changing the conveying direction of the glass sheet into a certain direction (for example the horizontal direction) can be set up further downstream of the quenching apparatus 3.

The following is an example of a method for manufacturing a curved glass sheet using the above-described apparatus. A glass sheet 4 made of soda lime silicate glass is heated in a furnace 1 to a temperature near its softening point (for example to a temperature between the strain point and the softening point of the glass), while conveying rollers 11 inside the furnace 1 convey it in horizontal direction, and is released in a shapeable state in the horizontal direction through a carry-out opening 12 of the furnace 1. When the glass sheet 4 is inserted into the bending apparatus 2, it is sandwiched between the first press roller 71, which is located at the most upstream position, and the forming block 6. The roller 71 presses the glass sheet 4 against the forming block 6 through the belt 5.

The belt 5, which is made for example of a belt cloth using stainless steel fibers, travels downstream in the glass conveying direction with a predetermined velocity while sliding along the forming face, guiding the glass sheet 4 downstream. Then, the front end of the glass sheet 4 reaches the second press roller 72, as is shown in FIG. 2. The travelling speed of the belt 5 is preferably set to a speed in the range from 80 mm/sec to 400 mm/sec. At this stage, the glass sheet 4 is still substantially flat, since no bending has been performed yet.

From the situation shown in FIG. 2, the glass sheet is conveyed further downstream. First, the glass sheet 4 is pressed against the forming block 6 while the second press roller 72 slowly lifts the front end of the glass sheet upwards. At this position, the forming face of the forming block recedes slightly upwards, while the glass sheet is also bent slightly in the cross direction. Thus, the bending of the glass sheet 4 begins at this stage.

During the bending, the entire upper surface of the glass sheet 4, which is pressed upwards by the press rollers 7, contacts the belt 5, so that the glass sheet 4 is conveyed while keeping a stable orientation.

Figure 10:
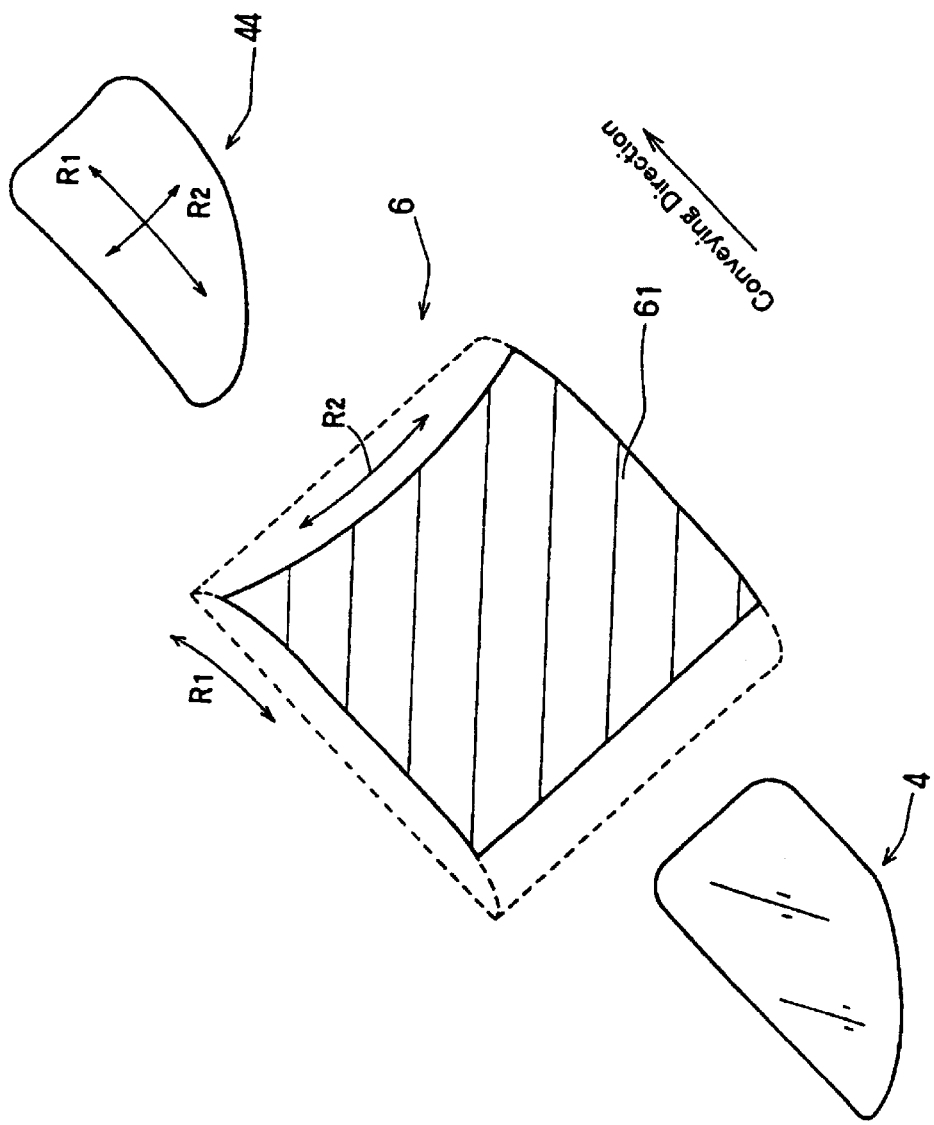
FIG. 10 is a drawing showing a bending member and the shape of a glass sheet before and after the bending.

FIG. 10 shows the glass sheet before and after the bending, together with the forming face 61. As is shown in FIG. 10, the flat glass surface 4 mirrors the shape of the forming face 61, so that for example a curvature radius of $R_1$ in the conveying direction of the glass sheet and for example a curvature radius of $R_2$ in the cross direction are imparted on the curved glass 44. Thus, the glass sheet is bent while traveling in the glass conveying passage.

Figure 11:
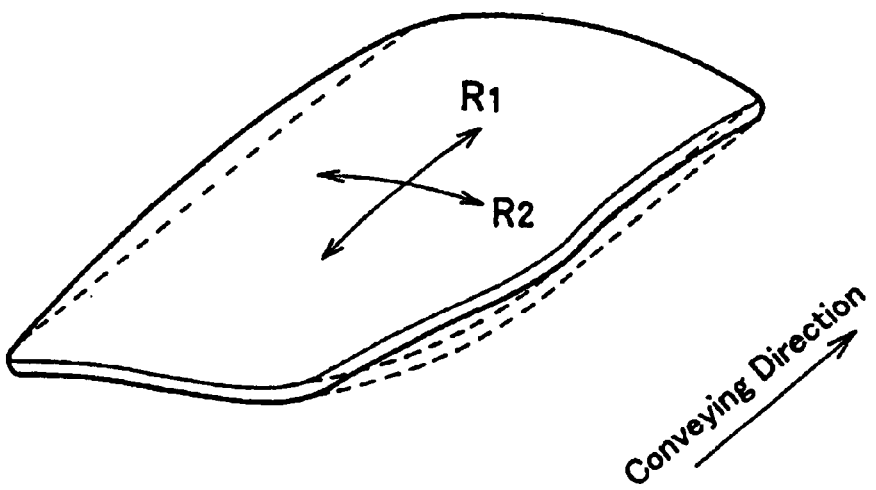
FIG. 11 is a perspective view showing the shape of a glass sheet that can be formed with the present invention.
Figure 12:
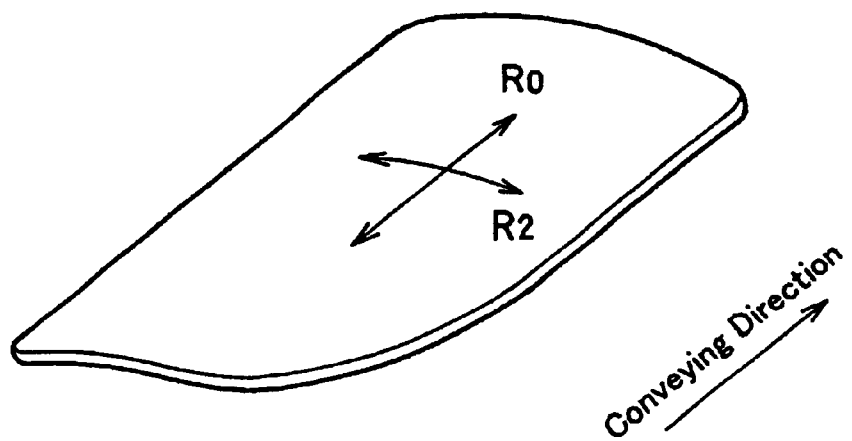
FIG. 12 is a perspective view showing the shape of another glass sheet that can be formed with the present invention.

Referring to FIGS. 11 and 12, the following explains the shapes of the curved glass sheet that can be formed with the method and the apparatus of the present invention. FIG. 11 is a perspective view of a glass sheet that has been formed using the forming face 61 shown in FIG. 10. Thus, in accordance with the present invention, bending with a curvature in two directions (two-dimensional bending) can be realized. Moreover, as shown in FIG. 12 (and by the dashed line in FIG. 11), by not imparting a curvature in the conveying direction, a cylindrical glass sheet can be formed. When the glass sheet is formed with the present invention, a constant curvature radius $R_1$ in the conveying direction (longitudinal direction) is imparted on the glass sheet, or no curvature radius is imparted (i.e. Ro=∞ in FIG. 12). On the other hand, with respect to the cross direction (lateral direction) of the glass sheet, a constant curvature radius $R_2$ can be imparted, or a plurality of curvature radii can be combined (as for example when forming with the forming block shown in FIG. 5).

After the glass sheet has passed through the bending region and has been formed into a predetermined shape, it passes a slit in a partition wall 32 and is conveyed into the quenching apparatus. In the quenching apparatus, the glass sheet 44 is tempered or semi-tempered by blowing cool air onto it while conveying it at a constant speed with the conveying rollers 31. The curved glass also can be annealed without quenching.

With this method, surface defects such as roller marks, that are difficult to avoid with conventional methods, do not occur, and a curved glass sheet can be continuously manufactured. Curved glass sheets with a curvature radius of for example 1300 mm in the conveying direction and a curvature radius of 50000 mm in the cross direction were obtained. Moreover, when forming a glass sheet with a forming block having a forming face that was unsymmetrical in the cross direction of the glass sheet, it was equally possible to manufacture a curved glass sheet efficiently without surface defects.

In this method, there is no need to stop the glass sheet for forming it. During the bending, at least one surface of the glass sheet is retained by the belt. Consequently, a curved glass sheet with little surface defects can be manufactured continuously and with high efficiency. There is no particular limitation to the thickness of the glass sheet to be manufactured.

Second Embodiment

Figure 13:
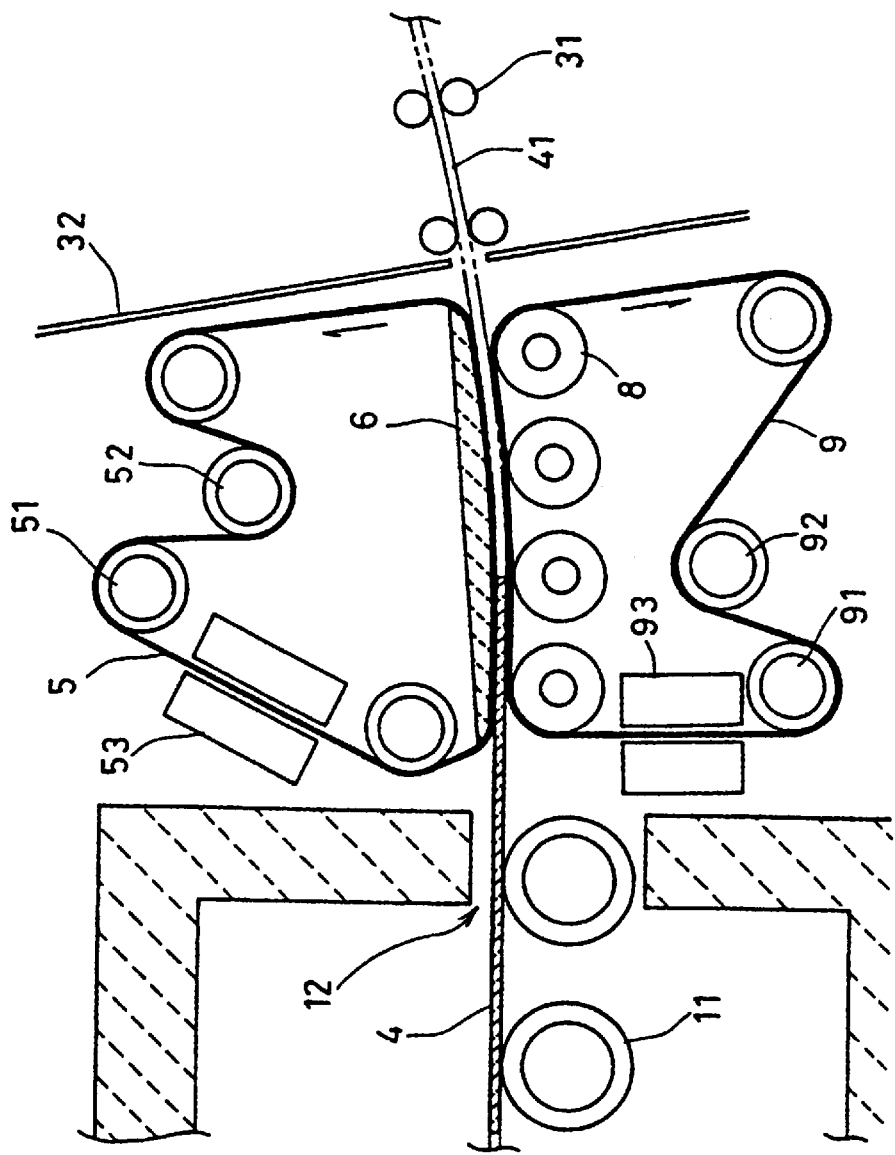
FIG. 13 is a cross-sectional view showing another embodiment of the bending apparatus.

FIG. 13 is a cross-sectional view showing the bending region of an apparatus according to another embodiment of the present invention. Except for the portion pushing the glass sheet upwards, this apparatus is the same as the apparatus shown in FIG. 2.

In the apparatus shown in FIG. 13, a second belt 9 is suspended by lower press rollers 8 below the glass conveying passage 41. Via the first belt 5 and the second belt 9, the press rollers 8 press the glass sheet 4 against the forming block 6.

Like the first belt 5, the second belt 9 is suspended in a loop-shape by rollers that include a driving roller 91 and a tension roller 92, and forms an endless track. A driving device (not shown in the drawings) is connected to the driving roller 91. By adjusting the position of the tension roller 92, the tension of the second belt 9 can be adjusted to suitable conditions. Moreover, a belt temperature adjusting device 93 is arranged on both sides of the endless track of the second belt 9. The temperature of the second belt 9 can be adjusted by heating or cooling with the temperature adjusting device 93. Preferable materials and manufacturing methods for the second belt 9 are the same as for the first belt 5.

With the apparatus shown in FIG. 13, the glass sheet 4 can be conveyed while sandwiching both faces between the belts 5 and 9. Thus, the condition of the surface of the curved glass and the degree of freedom for shaping it can be improved even further.

Third Embodiment

Figure 14:
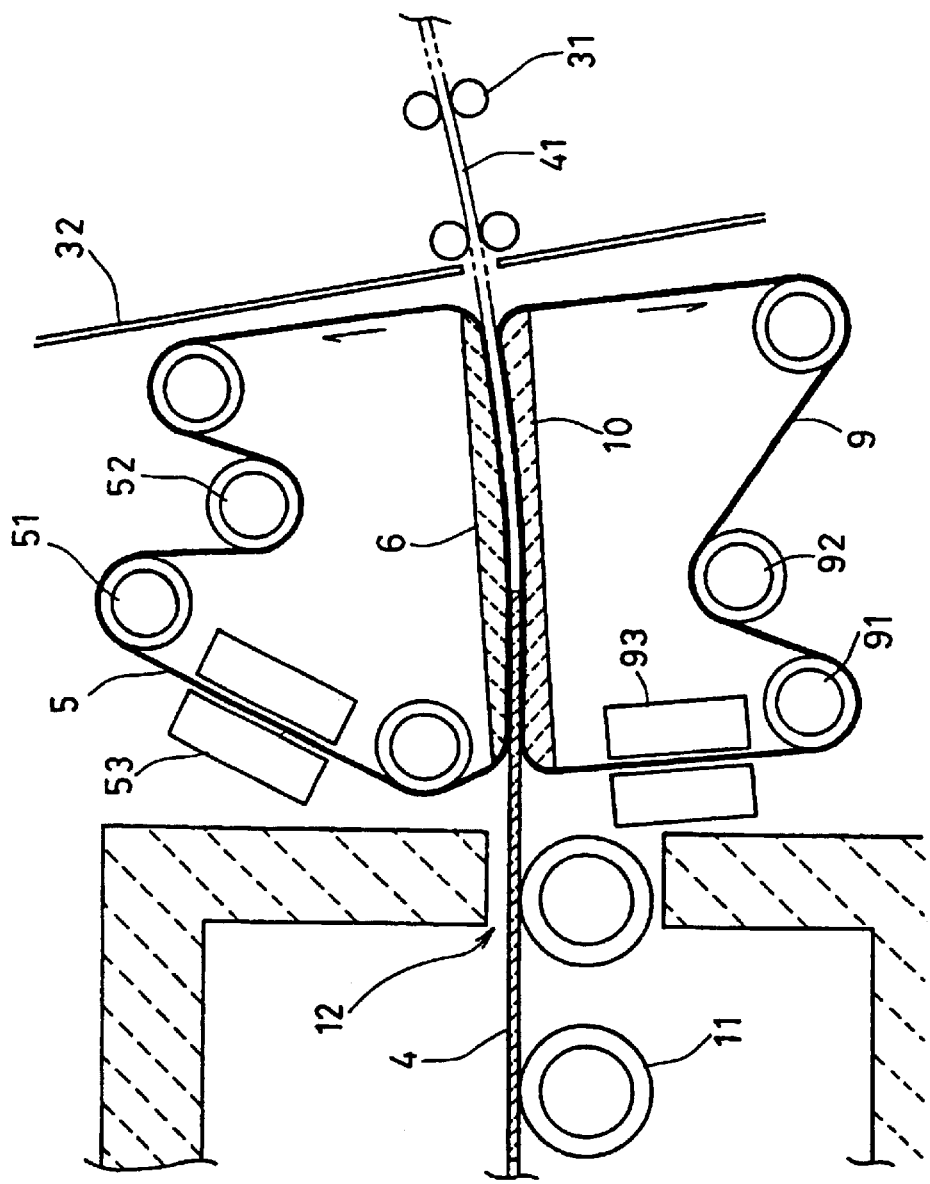
FIG. 14 is a cross-sectional view showing yet another embodiment of the bending apparatus.

FIG. 14 is a cross-sectional view showing the bending region of an apparatus according to another embodiment of the present invention. Except for the portion pushing the glass sheet upwards, this apparatus is the same as the apparatus shown in FIGS. 2 and 13.

In the apparatus shown in FIG. 14, a second belt 9 is suspended by a forming block 10 below the glass conveying passage 41. Via the first belt 5 and the second belt 9, the lower forming block 10 presses the glass sheet 4 upwards against the forming block 6. At the same time, the upper forming block 6 presses the glass sheet 4 against the lower forming block 10. Because the forming face of the lower forming block 10 has the inverse shape of the forming face of the upper forming block 6, both forming faces can be fitted into each other.

With the apparatus shown in FIG. 14, the two faces of the glass sheet 4 are sandwiched by the belts 5 and 9, and the glass sheet is transported while this pressure is being exerted on it. Consequently, like in the apparatus shown in FIG. 13, the surface condition of the curved glass sheet can be improved even further.

In the apparatus in FIGS. 13 and 14, which have belts arranged on both sides of the conveying passage, the glass can be conveyed by driving both belts, but it is also possible to have one belt running freely, and convey the glass sheet by driving only the other belt.

Forth Embodiment

A curved glass sheet of the same shape as the one manufactured in the first embodiment was manufactured, exchanging conveying direction and cross direction. In other words, the curvature radius in the glass sheet conveying direction was set to 50000 mm and in cross direction to 1300 mm. For the bending shape, basically the same apparatus as shown in FIGS. 1 and 2 was used.

However, since the curvature radius $R_1$ imparted on the glass sheet with respect to the conveying direction was larger, the conveying passage 41 in the quenching apparatus described a smoother curve, and as a result, the cooled glass sheet could be retrieved at a lower position and at an angle that was closer to the horizontal plane than shown in FIG. 1. This facilitated subsequent handling.

Thus, by setting $R_1 > R_2$ wherein $R_1$ is the curvature radius in the conveying direction and $R_2$ is the curvature radius in the cross direction, the conveyance of the glass sheet in the quenching apparatus and subsequent handling of the glass sheet was facilitated.

Fifth Embodiment

Figure 15:
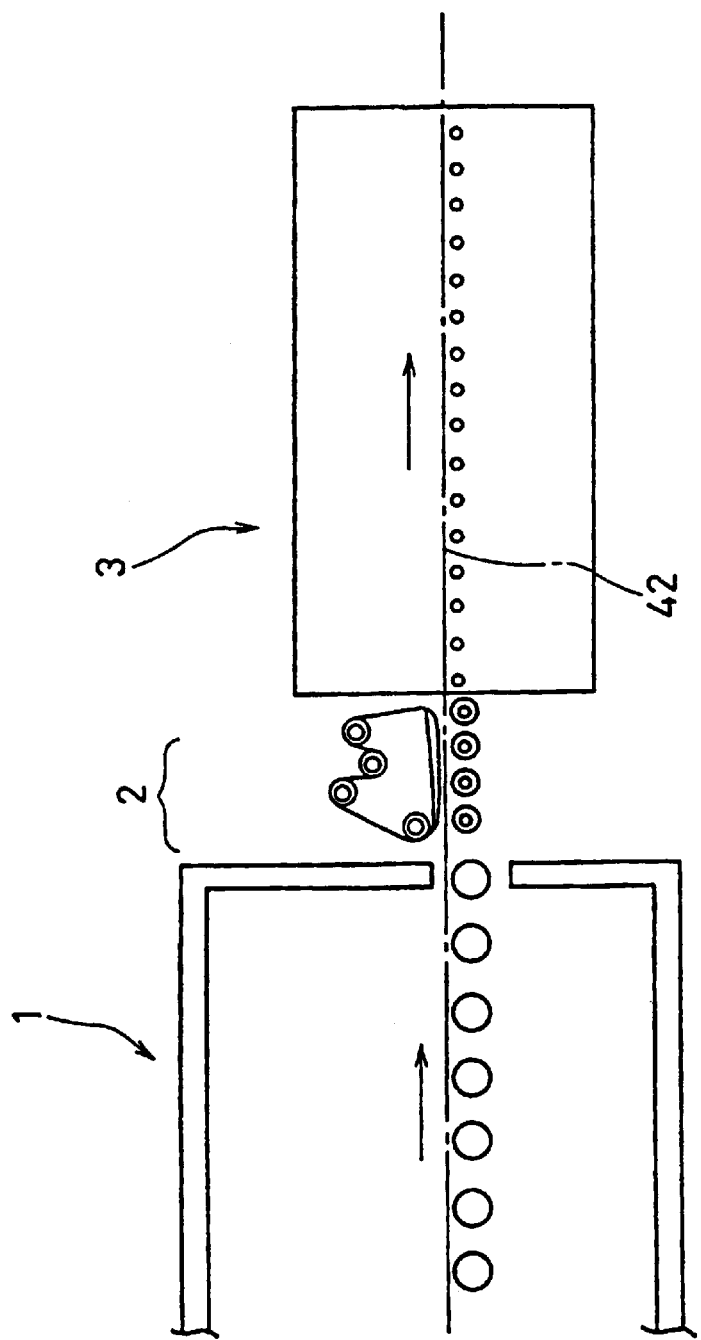
FIG. 15 is a cross-sectional view showing another embodiment of the manufacturing apparatus of the present invention.

FIG. 15 is a cross-sectional view showing a manufacturing apparatus according to another embodiment of the present invention. This apparatus can be used when the glass sheet is bent only in the cross direction. Except for the fact that the furnace 1, the bending apparatus 2, and the quenching apparatus 3 are arranged along a common conveying passage 42 that extends in the horizontal direction, this apparatus is basically the same as the apparatus of the first embodiment.

However, in the bending apparatus 2, the forming block is provided with a forming face that curves only in the cross direction of the glass sheet, progressively towards the downstream conveying side. Moreover, in the quenching apparatus 3, conveying rollers 33 are arranged only on the lower side of the glass conveying passage 42. Thus, if a glass sheet is bent into cylindrical shape with a curvature radius in only one direction, and if a curvature only in the cross direction is to be imparted, then the glass sheet can be conveyed in the horizontal direction. Therefore, subsequent handling and conveyance of the glass sheet becomes easier. With the apparatus shown in FIG. 15, a cylindrical glass sheet as shown in FIG. 12 can be formed.

INDUSTRIAL APPLICABILITY OF THE INVENTION

As has been detailed above, in accordance with the present invention a curved glass sheet with reduced surface defects such as roller marks can be manufactured efficiently by curving the glass sheet while conveying it with a belt. Moreover, in accordance with the present invention, a curved glass sheet can be manufactured that has a higher degree of forming freedom and a higher precision than the prior art. The curved glass sheets manufactured according to this invention are suitable as window glass for vehicles and buildings etc.

What is claimed is:

1. A method for manufacturing a bent glass sheet comprising:

heating a glass sheet in a heating furnace to a temperature where the glass sheet is changeable in shape, conveying the glass sheet out of the heating furnace, and bending the glass sheet by pressing the glass sheet together with at least one belt made of a heat-resistant material against a forming face of a bending member, wherein the glass sheet is bent while the glass sheet is conveyed along the forming face with the belt that travels between the glass sheet and the forming face, and the forming face is curved at least in the direction that is perpendicular to the conveying direction of the glass sheet.

2. The method according to claim 1, wherein a degree of curvature of the forming face gradually increases in the conveying direction of the glass sheet.

3. The method according to claim 1, wherein the forming face is also curved in the conveying direction of the glass sheet.

4. The method according to claim 1, wherein the glass sheet is conveyed with the belt so that the glass sheet gradually deviates from a direction in which the glass sheet is conveyed from the heating furnace.

5. The method according to claim 3, wherein the glass sheet is bent so as to have a predetermined curvature with respect to the conveying direction.

6. The method according to claim 1, further comprising cooling the glass sheet for quenching or annealing after separating the glass sheet from the belt.

7. An apparatus for manufacturing a bent glass sheet comprising:
   a heating furnace for heating a glass sheet to a temperature where the glass sheet is changeable in shape, and
   a bending apparatus adjacent to the heating furnace so as to accept the glass sheet from the heating furnace and bend the glass sheet while conveying the glass sheet, the bending apparatus including a conveying passage for the glass sheet,
   wherein the bending apparatus further includes a bending member having a forming face and at least one belt made of a heat-resistant material for conveying the glass sheet, and the forming face is curved at least in a direction that is perpendicular to the conveying direction of the glass sheet, and at least a portion of the belt is arranged along the forming face of the bending member, thereby contacting the forming face.

8. The apparatus according to claim 7, wherein a degree of curvature of the forming face gradually increases in the conveying direction of the glass sheet.

9. The apparatus according to claim 7, wherein the forming face is also curved in the conveying direction of the glass sheet.

10. The apparatus according to claim 7, wherein the conveying passage gradually deviates from a direction in which the glass sheet is conveyed from the heating furnace.

11. The apparatus according to claim 7, further including a cooling apparatus for quenching or annealing the glass sheet adjacent to the bending apparatus.

12. The apparatus according to claim 11, wherein the cooling apparatus includes a curved conveying passage for the glass sheet that has a predetermined curvature with respect to the conveying direction of the glass sheet.

* * * * *